United States Patent [19]
Tanaka et al.

[11] Patent Number: 5,321,835
[45] Date of Patent: Jun. 14, 1994

[54] METHOD OF CONTROLLING EXECUTION OF JOBS AND SYSTEM FOR THE SAME

[75] Inventors: Kazuaki Tanaka, Sagamihara; Akihiko Togawa, Yokohama, both of Japan

[73] Assignee: Hitachi, Ltd., Tokyo, Japan

[21] Appl. No.: 587,225

[22] Filed: Sep. 24, 1990

[30] Foreign Application Priority Data

Sep. 27, 1989 [JP] Japan .................. 1-249131

[51] Int. Cl.⁵ .................. G06F 11/00; G06F 9/00
[52] U.S. Cl. .................. 395/650; 364/DIG. 1; 364/281.9
[58] Field of Search .................. 395/650; 364/DIG. 1, 364/281.9

[56] References Cited

U.S. PATENT DOCUMENTS 4,819,156  4/1989  DeLorme et al. .................. 364/200

OTHER PUBLICATIONS

Hitachi Software Engineering Co., Ltd. APP VOS 3, VOS 3/SP, VOS 3/ES1, Integrated Operation Management System HOPSS 3 (Hitachi Operation Support System), General Statement APP-A-268-70, pp. 15-42. (No English translation available).

Primary Examiner—Gareth D. Shaw
Assistant Examiner—A. Katbab
Attorney, Agent, or Firm—Fay, Sharpe, Beall, Fagan, Minnich & McKee

[57] ABSTRACT

A method of controlling execution of a series of jobs includes the steps of executing the series of jobs sequentially, determining jobs to be rerun in the series of jobs as rerun jobs in accordance with the file access information when one of the series of jobs is terminated abnormally, the file access information indicating access to each of the files by each of the jobs, and rerunning the rerun jobs. When the rerun jobs are determined, the necessity of access to each of the files by each of the rerun jobs is determined in accordance with the file access information, and access to the files by each of said rerun jobs is selectively skipped in accordance with the result of determining the necessity of the access. Furthermore, when the series of jobs are executed, the files are allocated to an allocatable storage device in accordance with the file access information so that the jobs to be rerun become minimal.

20 Claims, 13 Drawing Sheets

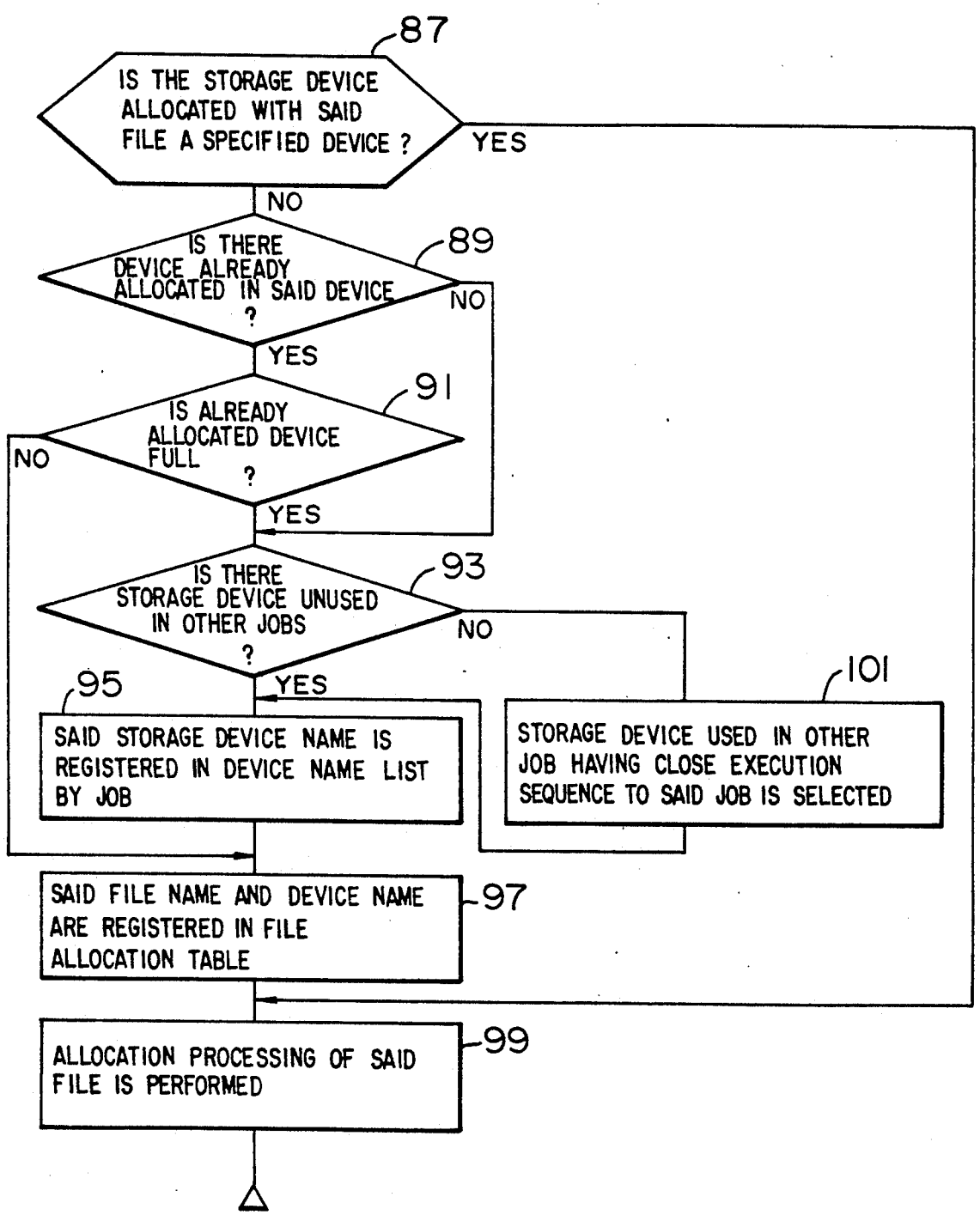

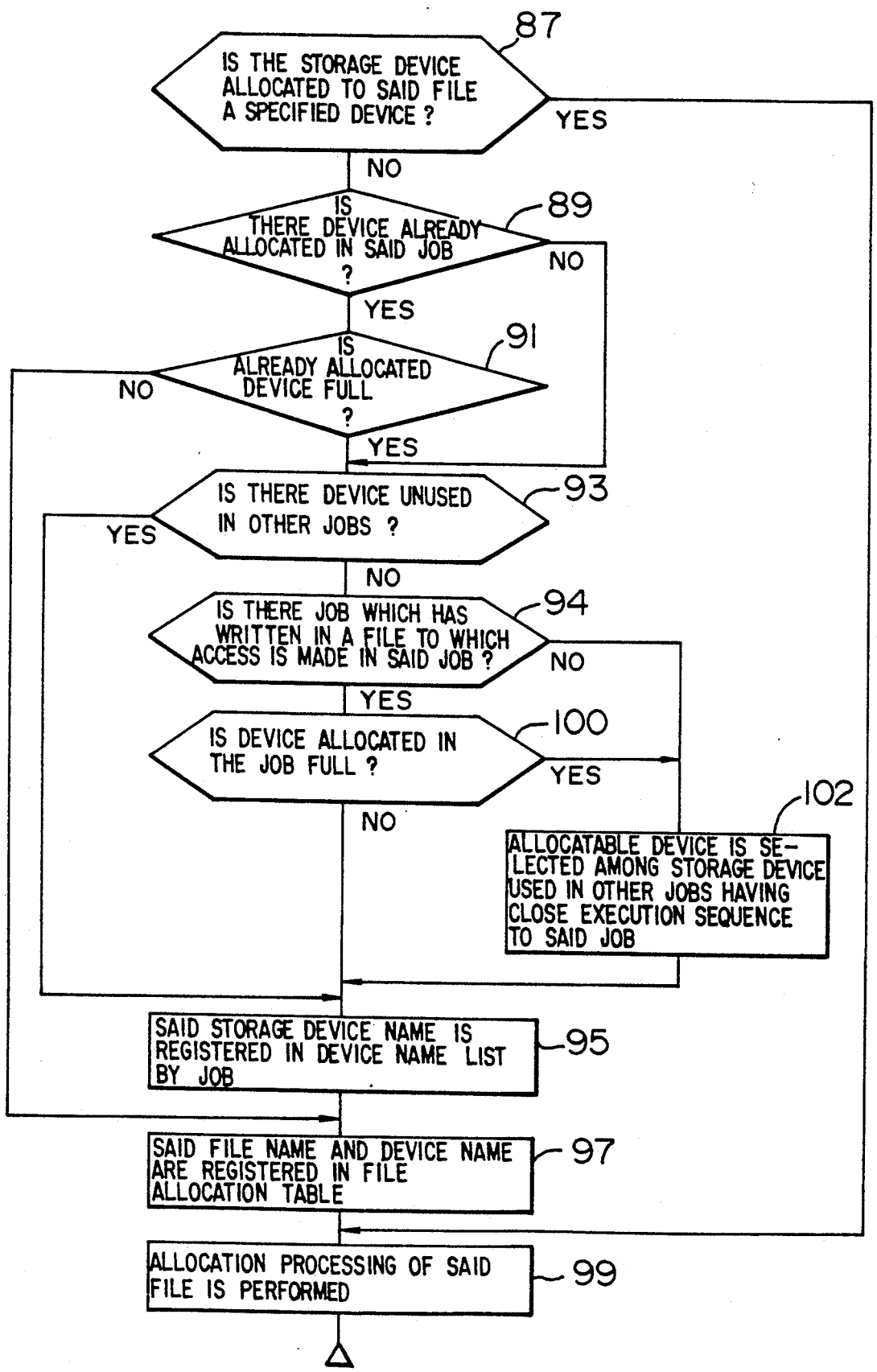

FILE ALLOCATION PROCESSING (STEP 75)

FIG. 15

JOB STEP NAME NOTICE PROCESSING 39A

JOB STEP NAME OF THE ITH ENTRY OF JOB STEP EXECUTION SEQUENCE TABLE AND INHERITED DATA ARE POSTED TO OS — 199

FIG. 16

JOB STEP NAME REGISTRATION PROCESSING 45A

JOB STEP NAME AND INHERITED DATA ARE REGISTERED IN EXECUTED JOB STEP NAME LIST — 201

FIG. 17

JOB STEP EXECUTION SEQUENCE TABLE REGISTRATION PROCESSING 16A

203: J = 1 ?

NO → 205: JOB STEP NAME OF THE JTH ENTRY AND INHERITED DATA OF THE (J-1)TH ENTRY OF EXECUTED JOB STEP NAME LIST ARE REGISTERED IN JOB STEP EXECUTION SEQUENCE TABLE

YES → 207: JOB STEP NAME OF THE JTH ENTRY OF EXECUTED JOB STEP NAME LIST IS REGISTERED IN JOB STEP EXECUTION SEQUENCE TABLE

METHOD OF CONTROLLING EXECUTION OF JOBS AND SYSTEM FOR THE SAME

BACKGROUND OF THE INVENTION

1. Field of the Invention

The present invention relates to a method of controlling execution of jobs for executing a plurality of jobs or job steps each being a unit for computer execution collectively and a system therefor.

2. Description of the Related Art

In order to obtain a desired result by utilizing a computer system, it is required in general to collectively execute a plurality of execution units, each being called a job or a job step (hereafter, described as a job collectively). For such a purpose, it is necessary for a user to inform execution sequence and execution condition of a series of jobs to the computer system. In order to provide a simple interface therefor, the execution sequence and the execution condition of a series of jobs are defined in advance of execution of jobs and a job execution management system controls the execution sequence of the jobs in accordance with the definition, as described in, for example, Hitachi Software Engineering Co., Ltd. APP VOS 3, VOS 3/SP, VOS 3/ES1 Integrated Operation Management System HOPSS 3 (Hitachi Operation Support System) General Statement APP-A-268-70, pp. 15–42. When a job under execution of the series of jobs is abnormally terminated, rerun is performed, in response to a command from a user, from a job corresponding to a job name indicated in the command.

In above-mentioned related art, when a certain job is abnormally terminated during execution of a series of jobs, it has been required that the user investigates the cause of abnormal termination of the job to determine from which job rerun is to be started, and input a rerun command which designates a name of the job to be started to rerun the series of jobs. Thus, it was necessary for an operator to stand-by for the abnormal termination.

Further, in determining the rerun starting job, when termination is made abnormally because of detection of trouble in a reading operation of data from a file, for instance, it is required to rerun from a job in which the file was written. Among the jobs on the way, however, there are jobs which only back up a certain file or which only output processing results to a printer. Such jobs are not required to rerun. In such a case, the rerun time has been made longer for that portion.

Furthermore, it is possible that a file which is stored in the same storage device as the file in which the trouble was detected has been destructed in a similar manner. Therefore, it is also required to determine the rerun job so that these files are specified and recreated. In that case, there is a method of allocating respective files to storage devices such that the storage device which stores that file is not specified in advance, but a storage destination is determined in a storage device having a vacant area among several storage devices at the time of job execution. When such a method is used, the scope of destructed files is expanded because the data of variety of files are stored in the same device, thus the scope of the jobs to be rerun are expanded, too.

SUMMARY OF THE INVENTION

It is an object of the present invention to provide a job execution management method which can automatically select rerun jobs and schedule them so as to prevent re-generation of non-destructed files paying attention to files to which respective jobs made access, at the time of scheduling rerun jobs caused by abnormal termination of the job on the way, and a system for the above-mentioned method. Further, it is another object of the present invention to provide a job execution management method which is able to control so as to skip unnecessary access to files among rerun jobs and a system for the above-mentioned method. Furthermore, it is still another object of the present invention to provide a job execution management method which is able to reduce the rerun time by controlling file allocation, so that the number of accesses to files becomes minimal, for example, by allocating the files to different storage devices in a unit of a job, thereby to limit the trouble scope to files that are related to relevant jobs.

The above-described objects may be achieved by, in a job execution management method in which the execution sequence and the execution condition of a series of jobs accompanied by access to files are stored and the jobs are activated automatically in turn based on the execution sequence and the execution condition in order to obtain desired result, storing access information records of all files made access by a series of jobs, and, when it is required to rerun jobs due to abnormal termination of a job in a series of jobs, specifying destructed files based on above-described access information records, determining the necessity of rerun of respective jobs and scheduling the jobs to be rerun based on the above.

By means of access information records, it is shown that the access to files is no-access, read-only, write-only and read-write, or it is shown that the access is no-access, read-only, write-only and read-write accesses and read-error, write-error and no-error.

Further, in a case that a job is abnormally terminated, if access to each file by above-mentioned job does not exist at all, rerun is made starting from that job, and otherwise, rerun is made starting from the head of a series of jobs.

Furthermore, in a job execution management method which is able to designate the job to start rerun in case of abnormal termination of a job, if no access to each file is made at all by the job abnormally terminated, rerun is made starting from the above-mentioned job, and, if access is made to any file, a series of jobs are rerun from the above-mentioned job which has been designated to start rerun.

Furthermore, preferably, the necessity of file access by each rerun job is determined based on the access to files by the jobs, and file access processing is skipped based on the above when file access demand from the rerun job is received.

Furthermore, preferably, when a job is composed of several job steps, access configurations to files from respective job steps and inheritance information between respective job steps are stored for every job step, and if a preceding job step is not rerun at the rerun time, the above-mentioned job step is rerun based on above-mentioned inheritance information.

Furthermore, preferably, in order to select a storage device allocated with files automatically and allocate files among a plurality of existing storage devices, different storage devices are allocated in a unit of job or in a unit of job step.

Furthermore, preferably, the objects of the present invention are achieved by, in a file allocation method in a job execution management method in which the execution sequence and the execution condition of a series of jobs are stored and the job is selected and activated automatically based on the above, providing a step of recording allocatable storage devices and selecting storage devices to which the files are allocated from above-mentioned storage device based on a reference for localizing a job rerun scope in response to a demand for allocating the file.

The objects of the present invention are achieved by selecting different storage devices in a unit of a job as the reference thereof.

The objects of the present invention are achieved by selecting different storage devices in a unit of job step as another means.

Furthermore, the objects of the present invention are achieved by selecting different storage device for each file as another means.

Furthermore, as another means, the objects of the present invention are achieved by recording every time a series of jobs are executed files to which access is made by the jobs, access configurations thereof and allocated storage devices and selecting storage devices to which files required of recovery together with a file in case that file is destructed are allocated in response to the demand of file allocation.

Furthermore, as another means, the objects of the present invention are achieved by recording jobs, files to which access is made and access configurations files to which access is made and access configurations thereof, classifying file groups required of recovery together in response to file allocation demand, and selecting a different storage device for every classification.

1. By applying above-described processing to a series of jobs in a following manner, it is possible to specify the jobs that do not require rerun and the files that do not require reaccess and to define rerun due to storage device trouble.

With this, it is possible to provide a job execution management method, in a job execution management system which schedules execution of a series of jobs, which automates rerun execution processing and reduces the rerun processing time by inhibiting unnecessary jobs to rerun and access to files.

(1) A user registers a job execution sequence table composed of the execution sequence and the execution condition of the jobs in the files provided by the job execution management system in advance prior to execution of a series of jobs.

(2) In response to the demand for execution of the job group by the user, the job execution management system analyzes the job execution sequence table mentioned in (1) which has been loaded on a main memory, and informs an operating system of a series of job names and file names to which access is made.

(3) The operating system creates a file access information table in which access modes and the like are recorded corresponding to respective jobs and respective files.

(4) The job execution management system selects the jobs meeting the execution condition and has these jobs executed through the operating system.

(5) In response to file allocation demand from the activated job, the operating system allocates those files to storage devices that are different by job.

(6) In response to file access demand from a job, the operating system skips access processing when above-mentioned access is an inhibiting object based on the file access information table.

Furthermore, "write", "read", "write error" and "read error" at the time of above-mentioned access time are set in the file access information table.

(7) In response to job termination notice from the operating system, the job execution management system receives data of the file access information table from the operating system and specifies the destructed file when the job has been abnormally terminated.

(8) The job execution management system specifies rerun jobs and files to be recovered which needs no access on the following basis.

When no access is made to all files from an objective job, or, in case that only read-access is made and that no read error occurs, even if there is any, above-mentioned job is not rerun.

When an access of write-only is made to a certain file from the objective job and if there are no access at all, read-only, or write-only and no destruction has been made in the following executed jobs, a flag is set up in the file access information table so as to skip the access to this file at the rerun time of the above-mentioned job.

When the access to all files from the objective job is , or no access, or read-only, the above-mentioned job is not return.

Return jobs are executed unconditionally from (8), a job execution sequence table for rerun in which virgin jobs are composed thereafter is created, and step (2) and steps thereafter are rerun.

2. By having above-described processing operate further as follows, it is possible to utilize the inherited data between job steps again at the time of rerun.

With this, inherited data are obtainable without rerunning a front-end job step. Therefore, it is possible to determine the necessity of rerun in a unit of job step, and further to reduce the rerun time.

(1) In respective steps of 1, execution is performed from in a unit of a job to in a unit of a job step. Therefore, the file access information table is also expanded so that the access may be recorded in accordance with correspondence between respective job steps and respective files.

(2) In the job execution management system, when there are inherited data, those data are recorded in the job execution sequence table as often as the job step is terminated.

(3) In 1.(8), the necessity of rerun and the necessity of access to files are determined in every job step.

(4) In 1.(9), the inherited data in (2) are added to the execution sequence table for rerun job steps, and are informed to the operating system in 1.(4).

BRIEF DESCRIPTION OF THE DRAWINGS

FIG. 9A is a detailed processing flow chart of file allocation processing of the operating system in the first embodiment;

FIG. 9B is a processing flow chart of another example of file allocation processing;

FIG. 15 is a job step name notice processing flow chart of the job execution management system in the second embodiment;

FIG. 16 is a job step name registration processing flow chart of the job execution management system in the second embodiment; and FIG. 17 is a job step execution sequence table registration processing flow chart of the job execution management system in the second embodiment.

DESCRIPTION OF THE PREFERRED EMBODIMENTS

A job execution management system of the present invention will be described hereafter with reference to the drawings.

Figure 1:
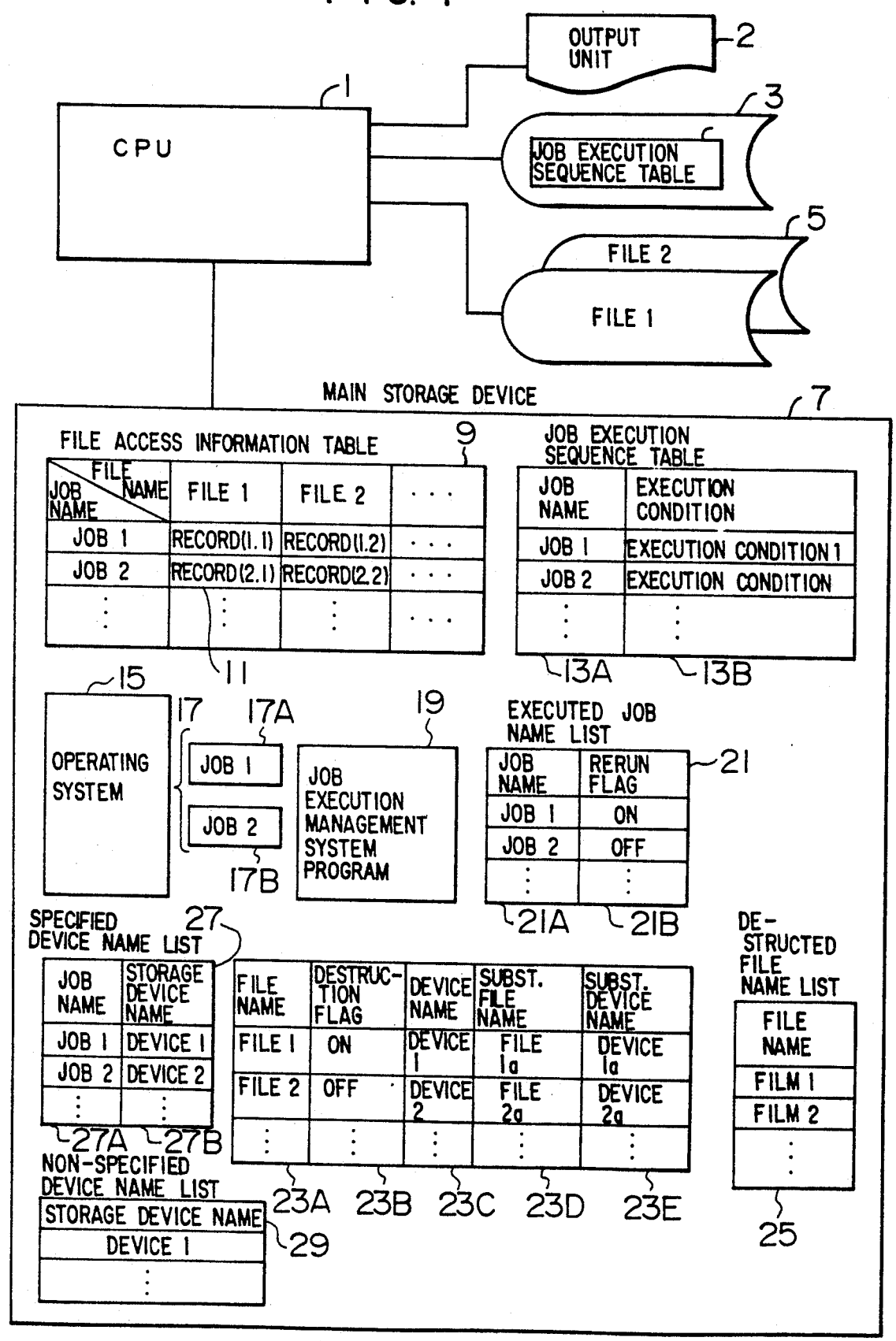
FIG. 1 is a general block diagram showing a first embodiment of the present invention.

FIG. 1 is a general block diagram of a first embodiment of the present invention. The present invention is applied to job processing for obtaining desired results by executing a plurality of jobs in combination. In processing of a series of jobs, the execution of these jobs is scheduled automatically by a job execution management system in accordance with designation of execution sequence of those jobs, and access modes from respective jobs to all files are stored as the access information. The job execution management system automatically determines the jobs to be rerun based on the above-mentioned access information when jobs are to be rerun upon abnormal termination of a certain job of the series of jobs. This is one of the features of the present invention. With this, it is possible to automate rerun processing and reduce the rerun time by skipping unnecessary rerun of the jobs. This is also a part of features of the present invention.

A first embodiment will be described in detail hereafter.

1 indicates a Central Processing Unit (CPU), 2 an output unit such as a printer or terminal equipment to which execution results and the like of a series of jobs are output, 3 a job registration file for registering a job execution sequence table 13 composed of an execution sequence 13A and an execution condition 13B of the series of jobs, 5 a file group accessed by jobs, and 7 a main storage unit.

In the main storage unit 7, 9 indicates a file access information table which is a characteristic element in the present invention, and which is composed of the series of job names, all the file names accessed by the respective jobs and an access information record 11 for managing access modes to the respective files by the respective jobs and so forth.

13 indicates a job execution sequence table loaded on the main storage unit 7, 15 an operating system program, 17 a job group in which 17A and 17B jobs 1 and 2, 19 a job execution management system program, and 21 an executed job name list which includes names 21A of actually executed jobs, among the series of jobs designated in the job execution sequence table 13 and rerun flags 21B for identifying jobs to be rerun.

23 indicates a file allocation table which includes a name of file 23A, a destruction flag 23B showing that the file has been destructed, a name of storage device 23C in which data in the file are stored, a name of a substitution file 23D which is used when the file is destructed, and a name of a substitution storage device name 23E in which data in the substitution file are stored, with respect to all the files accessed in the series of jobs.

25 indicates a destructed file name list in which destructed files are written, 27 a specified storage device name list which includes a job name 27A and a storage device name 27B respectively specified storage devices used in respective jobs, and 29 a list of non-specified storage devices which are designated by a user in advance, and which may be selected freely in the series of jobs.

Figure 2:
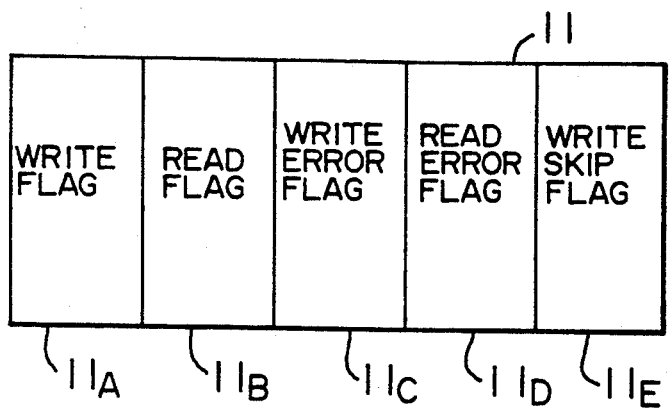
FIG. 2 is a block diagram of an access information record in the first embodiment.

The access information record 11 as an element of the file access information table 9 is for recording access mode to a certain file and so forth. As shown in FIG. 2, the access information record is composed of a write flag 11A showing whether or not data have been written in the file by a job, a read flag 11B showing whether or not data have been read from the file by the job, a write error flag 11C showing that a write error has occurred upon the write operation and a read error flag 11D showing that a read error has occurred in the read operation, and a write skip flag 11E for, when a write operation of data into a file has been demanded by the job at the time of rerun, causing the operating system 15 to inform completion of the write operation to the job without actually writing the data in a storage device in which the file is stored, as if the write operation has been accomplished normally.

The job execution sequence table 13 has been registered in the job registration file 3 by the user in advance prior to execution of the series of jobs.

The file allocation table 23, which is generated by the operating system 15, includes entries which are generated in advance from information from the user, e.g., a name of a storage device designated by a job control language to allocate a file and a name of a substitution file, and entries which are dynamically generated as the jobs are executed, i.e., new entries which is added when the file are allocated to the storage device.

An output unit such as a printer may be regarded as a printer file for which only a write operation is performed in a unit of job. With this, when only an output list in a normal state is required, it is possible to reduce rerun processing time by skipping the write operation to the output unit in the rerun.

Further, descriptions of input-output regions with respective files and work regions required for program execution are omitted in order to avoid complexity.

Figure 3:
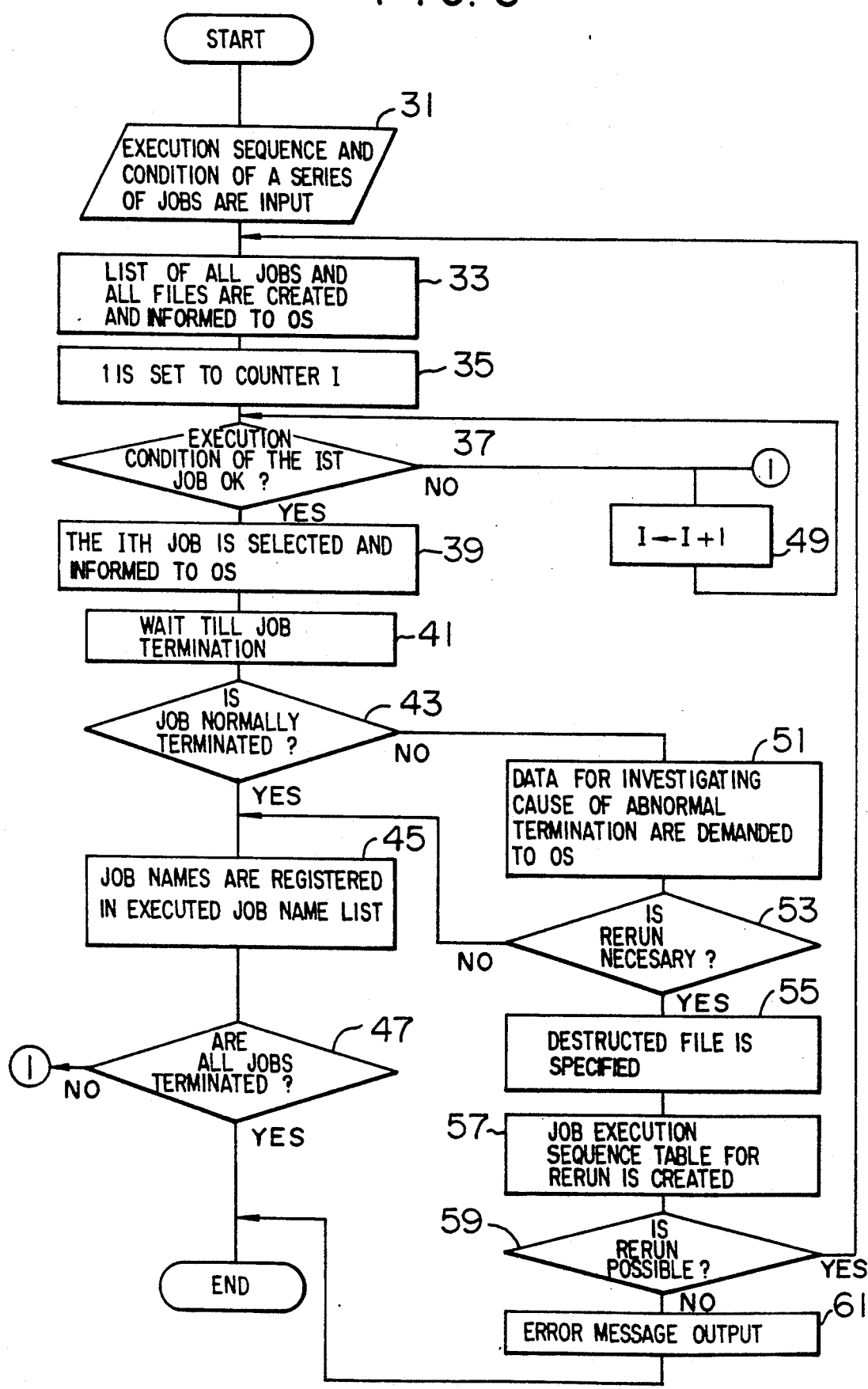
FIG. 3 is a processing flow chart of a job execution management system in the first embodiment.

The processing of a job execution management system program 19 are shown in detail in FIG. 3. In response to a request for execution of a job group from a user, the job execution sequence table 13 is loaded on the main storage unit from the file 3 (step 31). Then, job names of all the jobs in the above-mentioned table 13 and file names of all the files to which the jobs make access are informed to the operating system 15 (step 33). The file names may be determined by analyzing job control languages for the respective jobs or a load module for the jobs or by reading the file names, which are set in column in advance by the user, from the columns of the job execution sequence table.

In case where a name of a file to be accessed cannot be specified in advance or no file is accessed, only the job name is informed to the operating system 15.

Figure 4A:
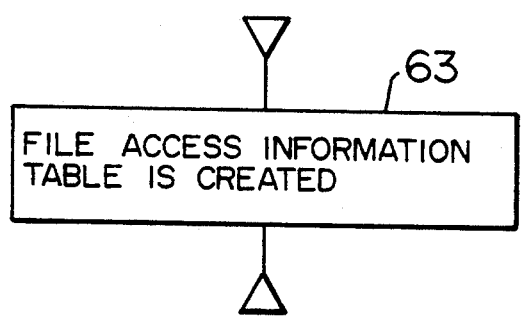
FIG. 4A shows processing of generating a file access information table by the operating system in the first embodiment.

The processing of the operating system 15 which receives the information in the step 33, generates a file access information table 9 composed the job names, the file names and a group of access information record 11 of a number obtained by multiplying the number of the job names by the number of the file names, as shown in FIG. 4A, (step 63). Thereafter, the control is returned to the job execution management system program 19. Each access information record 11 is initialized when the series of jobs are executed for the first time, and is initialized except for a write skip flag 11E at the start of rerun.

A counter I, which indicates an entry number of the job execution sequence table 13 (step 35) is set to "1", and it is judged whether or not the job of the Ith entry in the job execution sequence table 13 satisfies the execution condition (step 37). If YES in the step 37, the name of the job 13A of the Ith entry is informed to the operating system 15 (step 39) and termination of execution of the Ith job is waited (step 41).

Figure 5:
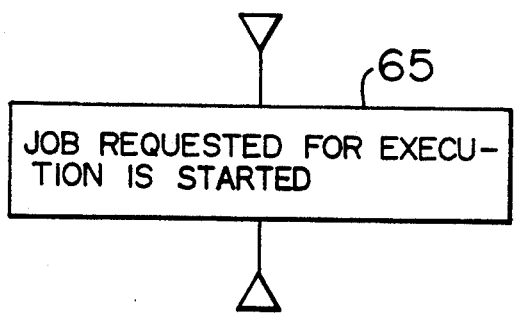
FIG. 5 shows processing of starting a job by the operating system in the first embodiment.

When receiving the information in the step 39, the operating system 15 starts the job requested for execution (step 65), as shown in FIG. 5.

Figure 6:
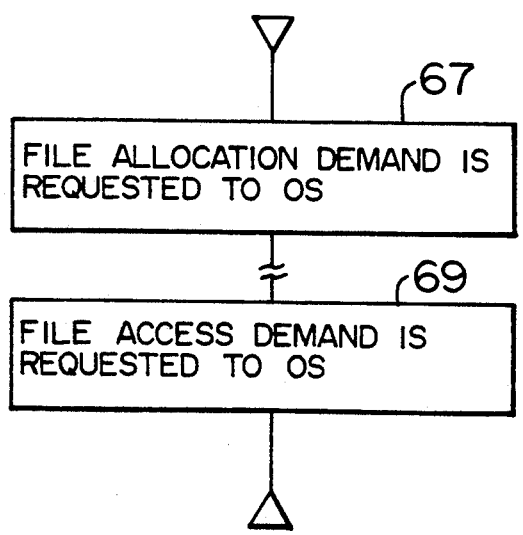
FIG. 6 is a processing flow chart showing an operation of the operating system in the first embodiment.

As shown in FIG. 6, the started job performs its processing while it outputs to the operating system 15 a file allocation request (step 67) and a file access request (step 69).

Figure 8:
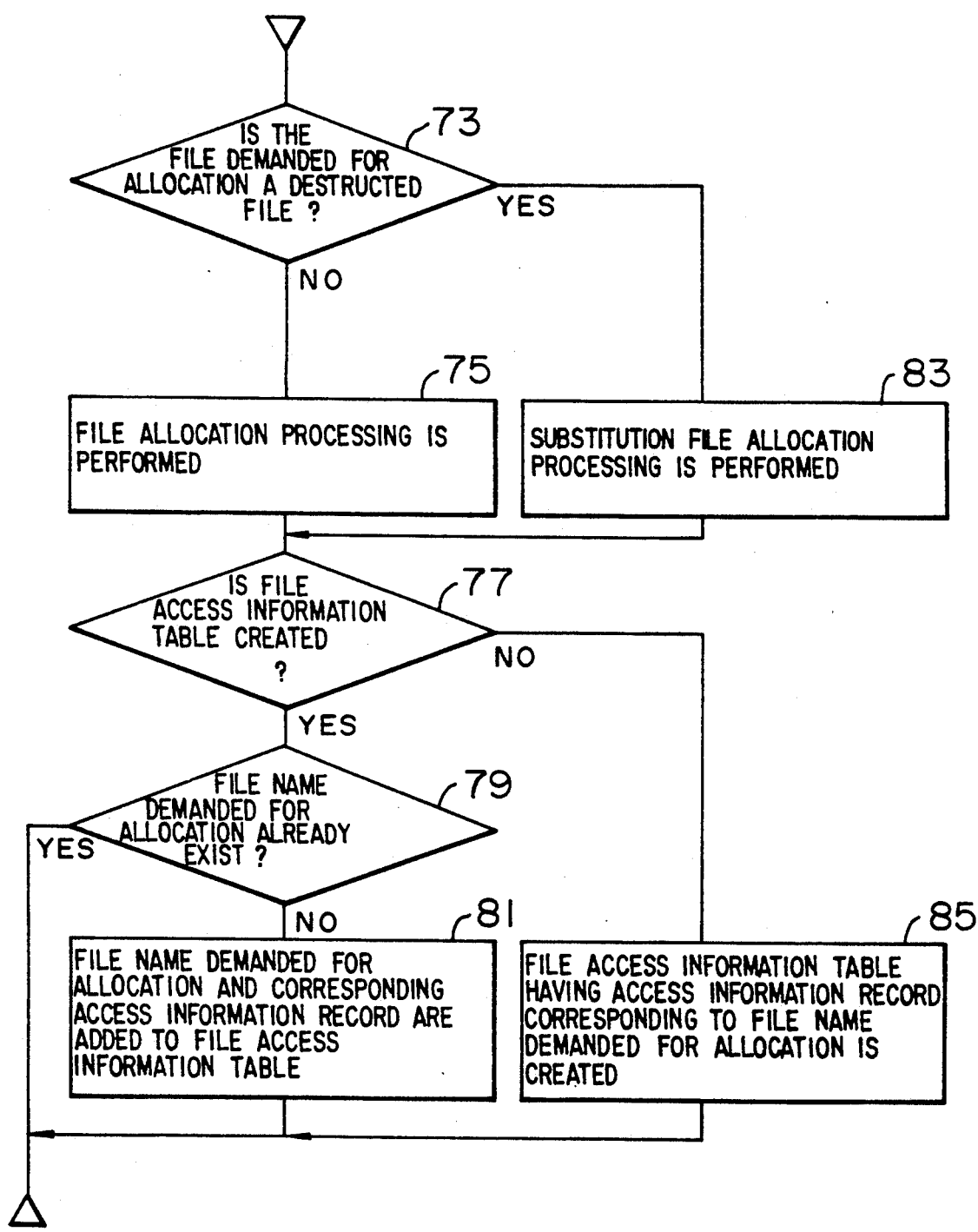
FIG. 8 is a file allocation demand processing flow chart of the operating system in the first embodiment.

In response to the file allocation request from the started job, the operating system 15 updates a storage device name list 27 so that the file designated by the request is allocated to a different storage device for every job. That is, the operating system 15, in response to the file allocation request, judges whether or not the requested file is destructed (step 73), as shown in FIG. 8. If NO in the step 73, file allocation processing is performed (step 75). If YES in the step 73, the file allocation processing using a substitution file is performed (step 83). Thereafter, it is judged whether or not the file access information table 9 has been generated (step 77). If YES in the step 77, it is judged whether or not the name of the requested file is already present in the file access information table 9 (step 79). If NO in the step 79, the name of the requested file and the access information records 11 corresponding to the name are added to the file access information table 9 (step 81). If NO in the step 77, the file access information table 9 including the name of the requested file corresponding to the name and access information records 11 is generated (step 85). After the step 81 or 85 or if YES in the step 79, the processing is returned to the job.

In the processing of file allocation in the step 75, it is judged whether or not the storage device allocated with the requested file is a specified storage device, as shown in detail in FIG. 9 (step 87). If YES in the step 87, the step 99 and the following steps are executed for the specified storage device. If NO in the step 87, the specified storage device name list 27 is referred to to determine whether or not there is a storage device which has been already allocated in this job (step 89). If NO in the step 89, the step 93 and the following steps are executed, and if YES in the step 89, it is judged whether or not the already allocated device is so full that there is no empty space required to allocate the file (step 91). If NO in the step 91, the step 97 and the following steps are executed to allocate the regenerated file to the relevant storage device. If YES in the step 91, it is judged whether or not a storage device unused in other jobs is present in a non-specified device name list 29 (step 93). If NO in the step 93, the step 95 and the following steps are executed after a storage device used in one of the other jobs having a closest execution sequence to the relevant job is selected (step 101). If YES in the step 93, the names 27A and 27B of the requested file and the allocated storage device are registered in the device name list 27 (step 95). Then, after the relevant file name and the allocated storage device name are added as a new entry to the file allocation table 23 (step 97), the conventional allocation processing is performed for the relevant file (step 99).

Figure 10:
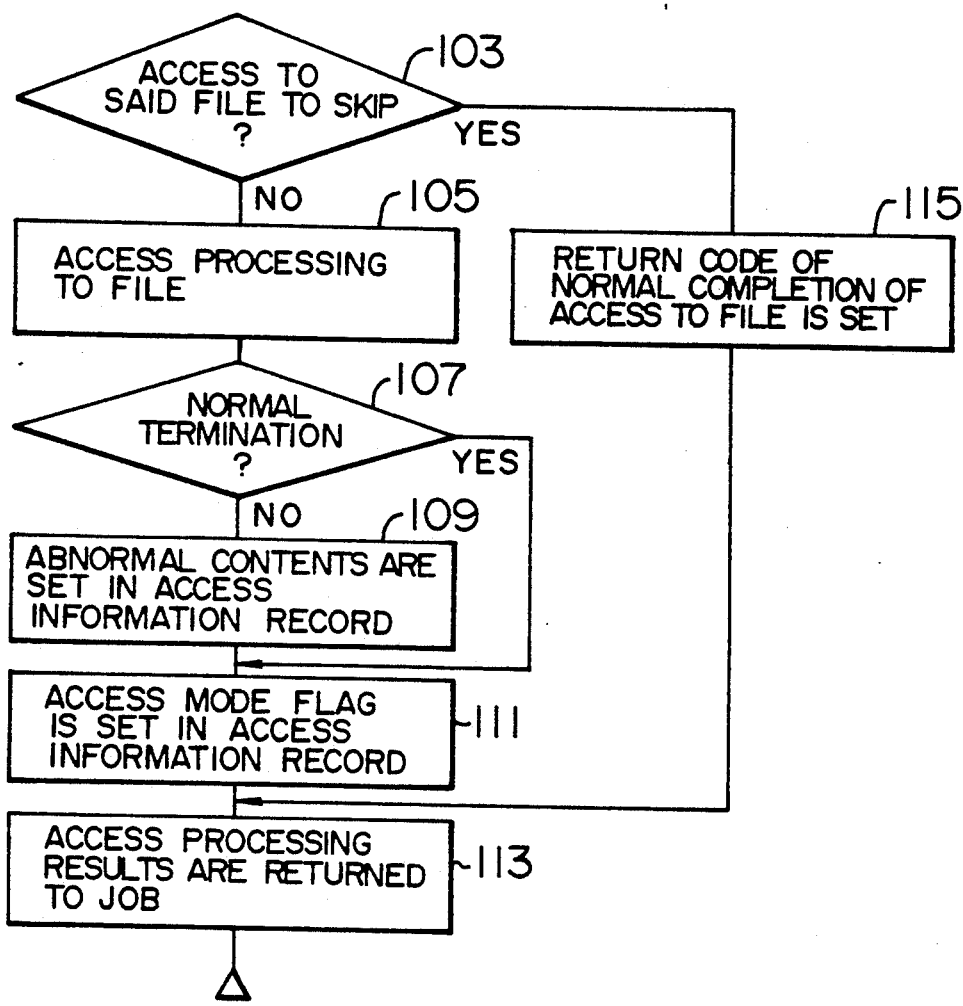
FIG. 10 is a file access demand processing flow chart of the operating system in the first embodiment.

In response to the file access request from the job in the step 69, the operating system 15 causes the job to skip access to a file based on the file access information table 9 if the file is inhibited, and also sets flags of "write", "read", "write error" and "read error" in the corresponding access information records of the file access information table. That is, as shown in FIG. 10, when receiving the file access request in the step 69 in FIG. 6, the operating system 15 judges whether or not the write skip flag is set of the access information record 11 relating to the relevant job and the requested file (step 103). If YES in the step 103, a return code showing that the write operation to the requested file has been normally completed is set (step 115), and the step 113 and the following steps are executed. If NO in the step 103, access processing to the file is executed (step 105) as conventional and it is judged whether or not normal termination has been made (step 107). If YES in the step 107, the step 111 and the following steps are executed, and if NO in the step 107, a write error flag 11C or a read error flag 11D in the access information record 11 is set to an ON state in accordance with whether the access request is a write request or a read request (step 109). Similarly, the write flag 11A or the read flag 11B in the access information record 11 is set to an ON state (step 111). Then, the access processing result is informed to the job (step 113) as conventional.

Note that the step 33 may be executed at the first time when the step 39 is repeatedly executed, or the operating system may generate the access information record from a name of a file which is dynamically allocated when a job is executed.

Figure 7:
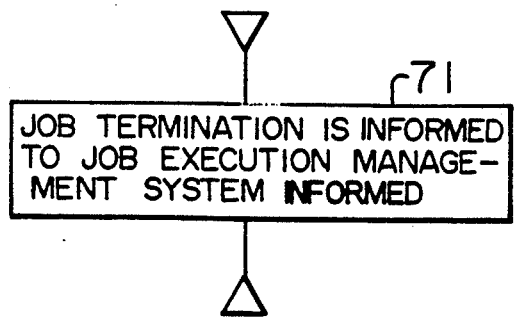
FIG. 7 shows job termination notice processing of the operating system in the first embodiment.

The job returns the control to the operating system 15 after terminating the objective processing. In response to this operation, the operating system 15 informs the job execution management system of the termination of execution of this job (step 71) as shown in FIG. 7.

When the job is terminated, it is judged from the termination code of the job whether or not the job has been terminated normally (step 43). If YES in the step 43, the name of the job is registered in an executed job name list 21 (step 45), and then it is judged whether all of the series of jobs have been terminated (step 47). If YES in the step 47, the processing is terminated, and if NO in the step 47, the step 49 and the following steps are executed repeatedly in order to execute a next job. That is, if NO in the step 47, the step 37 and the following steps are repeatedly executed after the counter I is incremented (step 49).

In a case that a job is abnormally terminated, the job execution management system receives each record 11 of the file access information table 9 from the operating system 15 and specifies the destructed files in response to the notice of job termination from the operating system 15. That is, if NO in the step 43, the data for investigating the cause of abnormal termination such as each access information record 11 of the file access information table 9 and the contents of the file allocation table 23 are requested to the operating system 15 (step 51).

Figure 11:
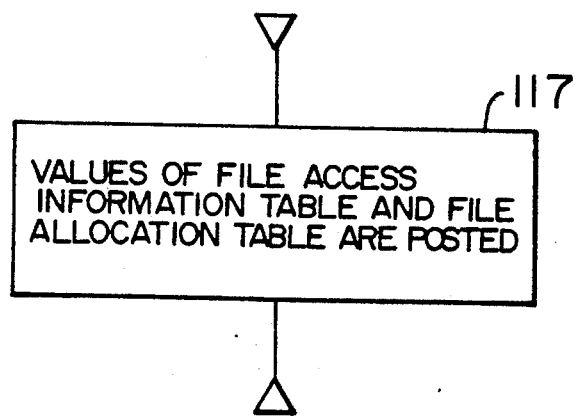
FIG. 11 is an abnormal analysis information notice processing flow chart of the operating system in the first embodiment.

The operating system 15, in response to the request in the step 51 of FIG. 3 informs the job execution management system of each content of the file access information table 9 and the file allocation table 23, as shown in FIG. 11 (step 117).

The job execution management system judges whether or not the write error flag 11C or read error flag 11D are set with respect to each access information record 11 relating to the executed jobs and judges the necessity for rerun of each job (step 53). If NO in the step 53, the step 45 and the following steps are executed. If YES in the step 53, the files destructed by the abnormal termination are specified (step 55).

Figure 12:
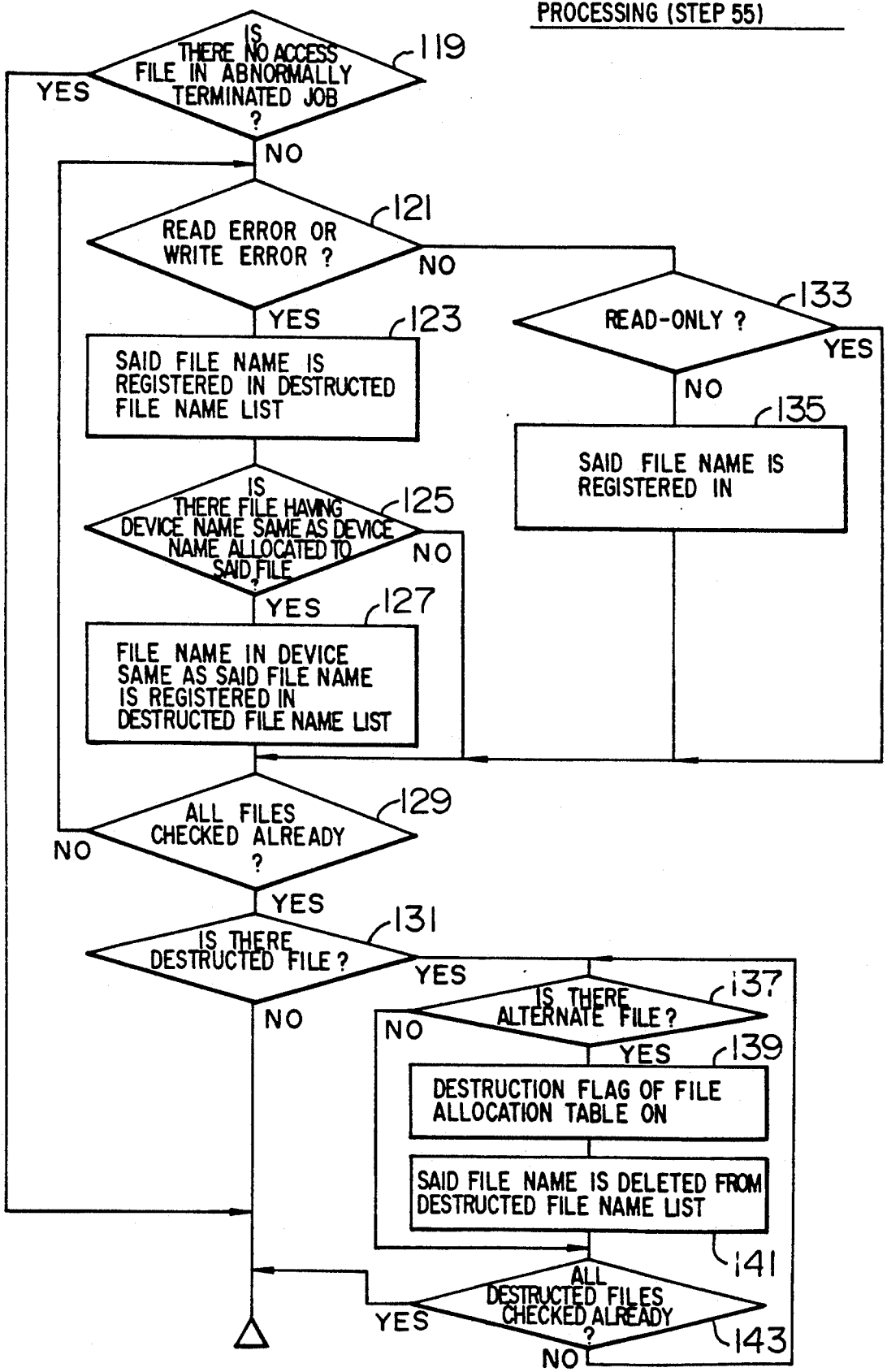
FIG. 12 is a destructed file specifying processing flow chart of a batch execution management system in the first embodiment.

As shown in detail in FIG. 12, in the processing of specifying the destructed files in the step 55, the access information records of all files related to the job abnormally terminated are referred to so as to judge whether both the write flag 11A and the read flag 11B of any access information record are in the OFF state, i.e., whether there is no access (step 119). If No in the step 119, it is judged whether or not the write error flag 11C or read error flag 11D of the access information record thereof is in the ON state, i.e., whether or not trouble occurrence is represented with respect to each file (step 121). If YES in the step 121, the relevant file name is registered in the destructed file name list 25 (step 123). Then, it is judged by using the file allocation table 23 whether or not there are files stored in the same storage device as the relevant file, i.e., whether or not files having the same storage device name (step 125). If NO in the step 125, the step 129 and the following steps are executed. If YES in the step 125, the names of the files stored in the same storage device is registered in the destructed file name list 25 (step 127).

It is judged whether or not the check of destruction has been made for all files (step 129). If NO in the step 129, the step 121 and the following steps are repeatedly executed. If YES in the step 129, it is checked whether or not there has been any destructed file (step 131). If YES in the step 131, it is judged whether or not there are any file which has the same file name as any of the file names in the destructed file name list 25 and which has the destruction flag 23B set to be OFF state, i.e., any file which is to be substituted with the destructed file (step 137). If NO in the step 137, the step 143 and the following steps are executed, and, if YES in the step 137, the destruction flag of the file allocation table 23 is set to the ON state (step 139), and the above-mentioned file name is deleted from the destructed file name list thereafter (step 141).

Then, it is judged whether or not check has been completed on all the destructed files (step 143). If NO in the step 143, the step 137 and the following steps are repeatedly executed. If YES in the step 119, if NO in the step 131, or if YES in the step 143, the processing of specifying the destructed files is terminated. If NO in the step 121, it is judged whether or not the write flag 11A of the access information record 11 is set to the OFF state and whether or not the read flag 11B thereof is set to the ON state (step 133). If NO in the step 133, the step 129 and the following steps are executed, and, if NO in the step 133, the relevant file name is registered in the destructed file name list 25 (step 135), and thereafter the step 129 and thereafter are executed.

It is a matter of course that an embodiment in which a plurality of substitution files are provided, and a further next substitution file is used in the step 137, when a substitution file is also destructed, may also be applicable.

After the destructed files are specified, a rerun job execution sequence table which includes the execution sequence and the execution condition of rerun jobs to be rerun is generated (step 57). That is, the job execution management system specifies the rerun jobs and files which need to be accessed, based on the following criteria.

(i) When there is no access to any of the files by an objective job or only the read access even if any, the job is not rerun.

(ii) When there is the write access to a certain file by the objective job, if there is no access, only the read access, or only the write access by the following executed jobs, and if the certain file is not destructed, the skip flag is set in the access information table so as to skip the access to this file.

(iii) When the access to all the files by the object job is the case (ii), no access, or only the read access, this job is not rerun.

Figure 13:
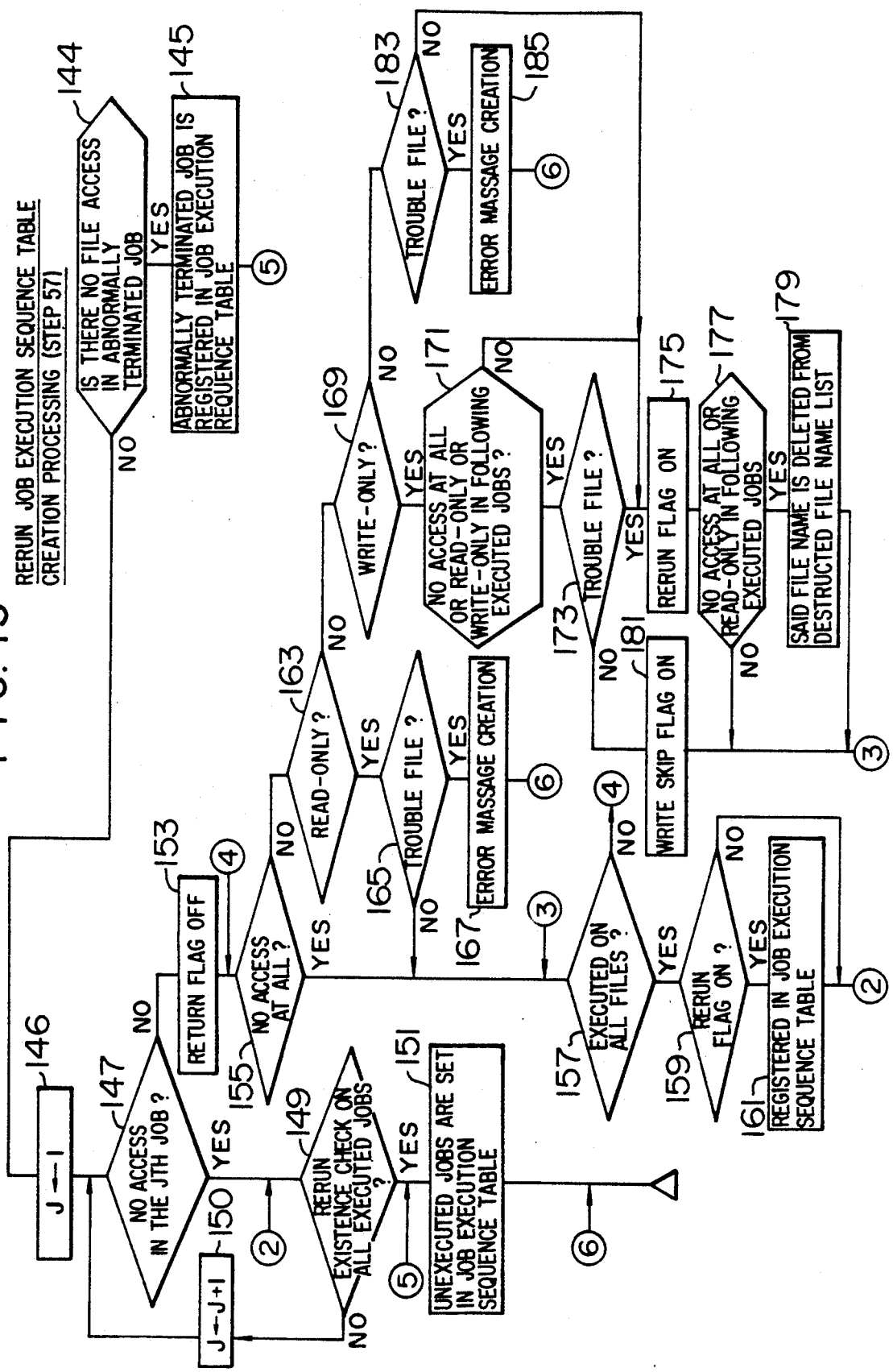
FIG. 13 is a rerun job execution sequence table creation processing of the job execution management system in the first embodiment.

The processing of generating the rerun job execution sequence table in the step 57 of FIG. 3 is shown in detail in FIG. 13. Referring to the address information records of all the files for the job abnormally terminated, it is judged whether both the write flag 11A and the read flag 11B of any access information record are set the OFF states, i.e., whether or not there is no access (step 144). If YES in the step 144, the job name is registered in the job execution sequence table so as to unconditionally execute the job abnormally terminated (step 145), and thereafter the step 151 and the following steps are executed. If NO in the step 144, "1" is set in a counter J which shows the entry number of the executed job name list 21 (step 146). Here, if the rerun start job name upon abnormal termination has been designated by the user, the entry number of the executed job name list corresponding to that job name is set at the counter J.

Thereafter, it is judged whether or not both the write flag 11A and the read flag 11B of all the access information records 11 in the file access information table 9 corresponding to the job name of the Jth entry of the executed job name list are set to the OFF state, i.e., whether or not there is no access by the relevant job (step 147). If NO in the step 147, it is judged whether or not both the write flag 11A and the read flag 11B of the access information record 11 are set to the OFF states with respect to individual file, i.e., whether the relevant file has not been made access to (step 155), after the rerun flag 21B of the relevant job is set to the OFF state (step 153).

If NO in the step 155, it is judged whether the write flag 11A of the access information record 11 is set to the OFF state and the read flag 11B is set to the ON state, i.e., whether or not there has been only the read access to the relevant file by the relevant job (step 163). If YES in the step 163, it is judged whether or not the relevant file name has been registered in the destruction file name list 25 (step 165). If YES in the step 165, the rerun job execution sequence table generation processing is terminated after an error message is generated (step 167).

If NO in the step 163, it is judged whether or not the write flag of the access information record 11A is set to the ON state and the read flag 11B is set to the OFF state, i.e., whether or not there is only the write access (step 169). If YES in the step 169, it is judged whether there is no access, only the read access, or only the write access by the executed jobs following to the job abnormally terminated (step 171). If NO in the step 171, the step 175 and steps thereafter are executed. If YES in the step 171, it is judged whether or not the relevant file name has been registered in the destructed file name list 25 (step 173). If NO in the step 173, the skip flag of the relevant access information record 11 is set to the ON state (step 181), their the step 157 and steps thereafter are executed. If YES in the step 173, the rerun flag 21B of the relevant job in the executed job name list 21 is set to the ON state (step 175). Next, it is judged whether there is no access or only the read access by the executed jobs following to the jobs abnormally terminated (step 177). If YES in the step 177, the relevant file name is deleted from the destructed file name list (step 179), then the step 157 and steps thereafter are executed. If NO in the step 169, it is judged whether or not the relevant file name has been registered in the destructed file name list 25 (step 183). If YES in the step 183, an error message is generated (step 185), and the processing of generating the rerun job execution sequence table is terminated thereafter. If NO in the step 183, the step 175 and steps thereafter are executed. If YES in the step 155, if NO in the step 165, if NO in the step 177, or after the step 179 or 181 is executed, it is judged whether or not checking of the access information record has been completed on all the files (step 157). If NO in the step 157, the step 155 and steps thereafter are repeatedly executed. If YES in the step 157, it is judged whether or not the rerun flag 21B of the relevant job is set in the executed job name list 25. If NO in the step 159, the step 149 and steps thereafter are executed. If YES in the step 159, the job name is registered in the job execution sequence table 13 (step 161), then the step 149 and steps thereafter are executed. At this time, the execution condition is set so as to unconditionally perform the job. If YES in the step 147, it is judged whether or not each of the executed jobs is to be rerun (step 149). If NO in the step 149, "1" is added to the counter J (step 150), and the step 147 and steps thereafter are repeatedly executed. If YES in the step 149, unexecuted jobs of the (I+1)th entry and jobs thereafter in the job execution sequence table 13 follow to the already registered jobs in the table 13 (step 151), and thus completing the processing of generating the job execution sequence table. In FIG. 3, the rerun sequence table is generated (step 57), and it is judged thereafter whether or not rerun is possible (step 59). If YES in step 59, the step 33 and steps thereafter are rerun. If NO in the step 59, an error message is output and execution of the series of jobs is terminated (step 61).

An example of file allocation processing upon generating the file access information table will be described in detail hereafter with reference to FIG. 4B.

After generating the file access information table 9 (step 63), the number of jobs in the series of jobs is set to a counter JJ (step 97), the number of allocatable storage devices is set to a counter II (step 909), "1" is set to a counter K which points an objective file (step 911), and "1" is set to a counter KK which points an objective job (step 913). Thereafter, it is judged whether or not the storage device allocated to the Kth file is a specified storage device (step 915). If YES in the step 915, the step 927 and thereafter are executed. If NO in the step 915, it is checked whether or not the Kth file is write accessed by the KKth job and whether or not the write flag 11A of the corresponding access information record 11 is ON (step 917). If YES in the step 917, it is judged whether or not the Kth file is write or read accessed by any of 1st to KKth jobs in accordance with whether or not both the write flag 11A and the read flag 11B of the corresponding access information record 11 are ON (step 919). If YES in the step 919, the step 920 is executed. In the step 920, it is judged whether or not the Kth file is only write-accessed by the Jth job and preceding jobs. If YES in the step 920, the step 923 and steps thereafter are executed. If NO in the step 920, the files which are read- or write-accessed by the preceding jobs and the Kth file are registered to belong to the same group (step 921). If NO in the step 917 and NO in step 919, the step 923 and steps thereafter are executed. In the step 923, it is judged whether or not a value obtained by adding "1" to the counter KK is larger than the value of the counter JJ. If NO in the step 923, "1" is added to the counter KK (step 925), then the step 917 and steps thereafter are executed. If YES in the step 923, it is judged whether or not a value obtained by adding "1" to the counter K is larger than the value of the counter II (step 927). If NO in the step 927, "1" is added to the counter I (step 929), then the step 913 and the following steps are executed. If YES in the step 927, the storage devices are allocated so that the files of the same group are allocated to the same storage device (step 931), and respective file names and allocated device names are added as new entries of the file allocation table 23 thereafter (step 933).

With this, when the mode of making access to the file by respective jobs is determined in advance or is specified from the execution contents in the past, the file group influenced by the trouble can be specified in advance and can be allocated to the same storage device collectively, thus making it possible to localize the scope of rerun in a series of jobs as a whole.

Next, another example of file allocation processing will be described with reference to FIG. 9B. Note that the same numbers are affixed to the same processing steps as those shown in FIG. 9A, and the description thereof will be omitted.

If NO in the step 93, it is judged whether or not there are write-accessed files by already executed jobs among the files to which access is made by the job (step 94). Note that an embodiment in which a file which has not been write-accessed by that job is not the object of the judgement may be adopted in the step 94.

If YES in the step 94, it is judged whether the storage device is so full that there is not enough vacant space to allocate the objective file to the storage device for the job which performs write processing (step 100). If NO in the step 100, the step 95 and thereafter are executed for allocating the relevant file to that storage device.

When there are a plurality of relevant jobs in the step 94, judgement processing is repeatedly executed until the answer "NO" is obtained from the step 100 in an order closer to the relevant job, i.e., until the storage device to which the objective file is allocated is found. If NO in the step 94 and YES in the step 100, it is the storage device used in other job which has the closest execution sequence to the relevant job, and, after the storage device to which the objective file is allocatable is selected (step 102), the step 95 and steps thereafter are executed.

Figure 9C:
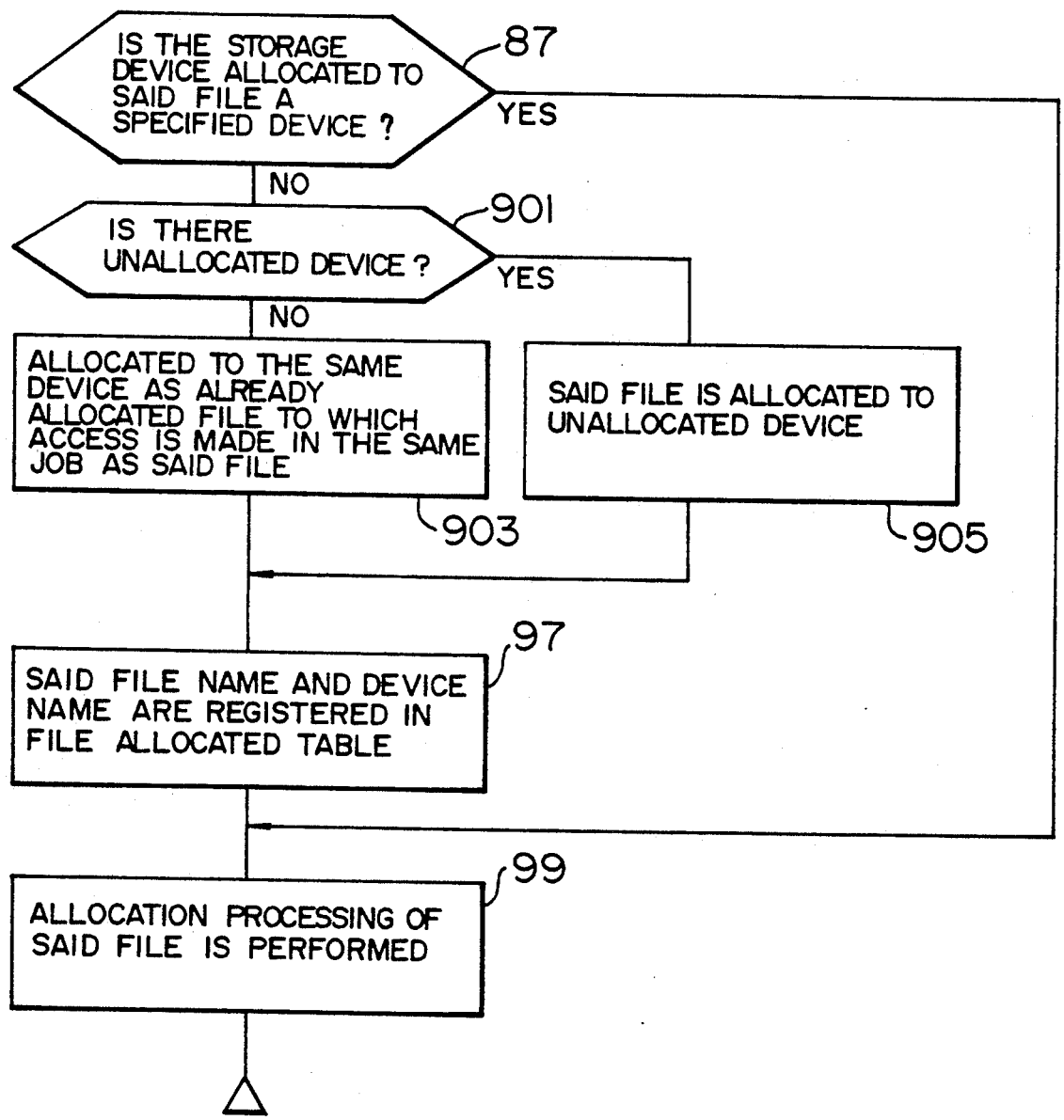
FIG. 9C is a processing flow chart of still another example of file allocation processing.

Another embodiment of file allocation processing in the step 75 will be described with reference to Fig. 9C. In this embodiment, it is judged whether or not the storage device allocated to the above-mentioned file is a specified device (step 87). If YES in the step 87, the step 99 and steps thereafter are executed for the specified storage device. If NO in the step 87, it is judged from the non-specified device name list whether or not there is a non-allocated storage device (step 901). If NO in the step 901, the same storage device as already allocated file access is made by the same job as the above-mentioned file is selected (step 903), and, after the above-mentioned file name and the allocated device name are added as new entries of the file allocation table 23 (step 97), allocation processing which has been heretofore executed is executed for the above-mentioned file (step 99). If YES in the step 901, one of the non-allocated devices is selected (step 905), then the step 97 and steps thereafter are executed.

With this, when storage devices corresponding to the number of files exist, it is possible to localize the scope of influence by storage device trouble and to reduce rerun processing objects so as to reduce the rerun time by allocating respective files to different storage devices to the utmost.

Figure 4B:
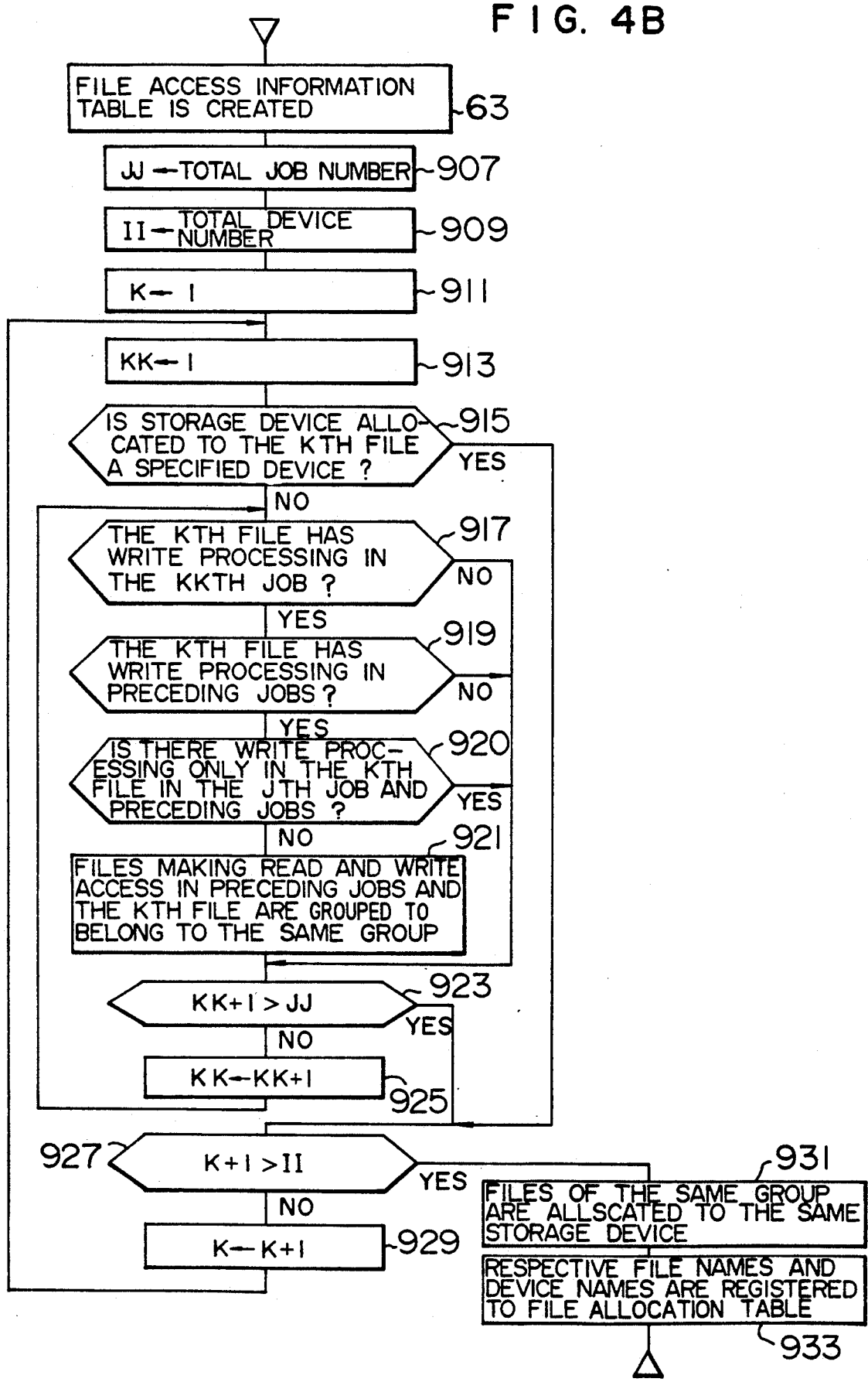
FIG. 4B is a processing flow chart of another embodiment of file allocation processing.

Furthermore, as another embodiment of the step 75, when the files to which access is made by respective jobs and access modes thereof are informed in advance by a user or are obtained by monitoring the execution results in the past, the file allocation destination is not determined for individual file as the step 75, but the allocation destination may be determined collectively with respect to the files to which access is made by the series of jobs, in place of the step 63 as shown in FIG. 4B. In this case, only the processing of allocating the files to the determined destination (step 99) may be required in the step 75. Otherwise, an embodiment in which the allocation processing is executed collectively in the processing shown in FIG. 4B thereby to skip the step 75 may also be employed.

Next, a second embodiment of a job execution management system according to the present invention will be described. The second embodiment is different from the first embodiment in a point that the rerun unit is the job step. That is, in the second embodiment, by further modifying respective steps in the first embodiment in a manner described hereunder, inheritance data between job steps are utilized again at the time of rerun. With this, inheritance data are obtainable without rerunning the preceding job steps. Therefore, it is possible to determine the necessity of rerun in a unit of job step, and further to reduce rerun time.

(i) The above-mentioned respective steps are executed not in a unit of a job, but in a unit of a job step. Accordingly, the file access information table is also expanded so that respective job steps and access information thereof corresponding to respective files can be recorded.

(ii) In the job execution management system, when there are inheritance data, they are recorded in the job execution sequence table whenever the job step is terminated.

(iii) The necessity for rerun and the necessity for access to file are determined in every job step.

(iv) The inheritance data are added to the execution sequence table for the rerun job steps and informed to the operating system. In this manner, the job in the description of the first embodiment is to read a job step. Also, the job name is read as a job step name obtained by combining the job name and the step name.

Figure 14:
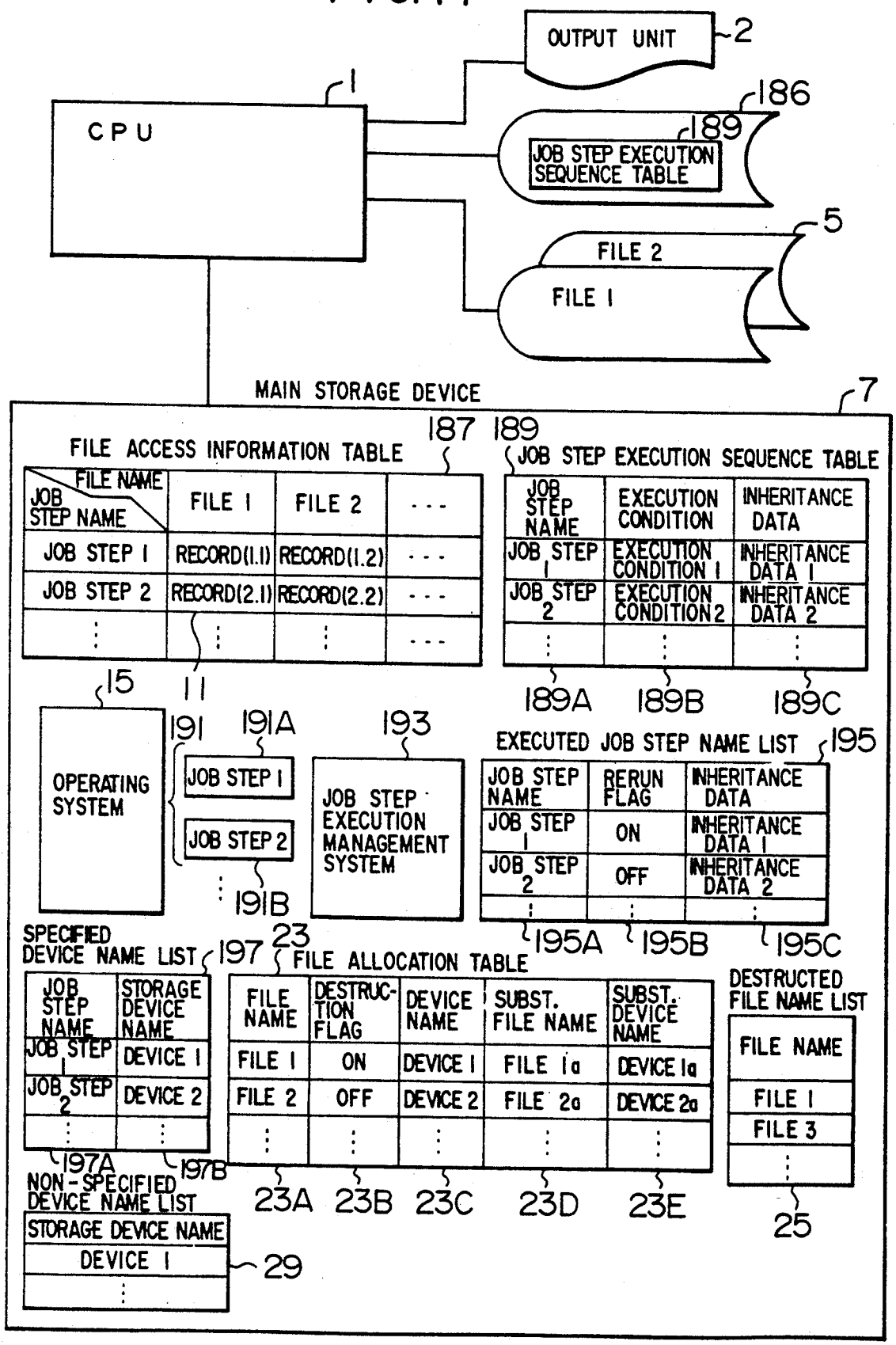
FIG. 14 is a general block diagram of a second embodiment.

Furthermore, as to the general configuration, as shown in FIG. 14, a job step execution sequence table file 18b, in which a job step execution sequence table 189 is registered, is provided in place of the job registration file 3 of FIG. 1. A file access information table 187 is composed of the job step names, the file names and access information records corresponding to each of them is provided in place of the file access information table 9 of FIG. 1. The job step execution sequence table 189 is composed of a job step name 189A, execution condition 189B of each job step, and inheritance data 189C, inherited from the preceding job step at the time of normal termination to use in the rerun of the above-mentioned job step, is provided, in place of the job execution sequence table 13 of FIG. 1. A job step group 191 includes a job step 1 (191A), a job step 2 (191B) and so forth, in place of the job group 17 of FIG. 1. A job execution management system 193 which manages execution jobs in a unit of job step is provided in place of the job execution management system 19 of FIG. 1. An executed job step name list 195 composed of a job step name 195A, a rerun flag 195B and inheritance data 195C which are delivered to a following job step is provided in place of the executed job name list 21 of FIG. 1. Also, a device name list by job step 197 composed of a job step name 197A and a storage device name 197B is provided in place of the specified storage device name list 27 of FIG. 1.

Further, processing 39A of FIG. 15 is executed in place of the job step name notice processing 39 of FIG. 3. That is, a job step of the Ith entry of the job step execution sequence table 189 is selected and the job step name and the inheritance data thereof are informed to the operating system (step 199).

Further, processing 45A of FIG. 16 is executed in place of the job step name registration processing 45 of FIG. 3. That is, the job step name and the inheritance data are set in the executed job step name list 195 (step 201).

Further, processing 161A of FIG. 17 is executed in place of job step execution sequence table registration processing 161 of FIG. 13. That is, it is judged whether or not the counter J is at "1" (step 203). If NO in the step 203, the job step name of the Jth entry data of the (J−11)th entry are registered in the job step execution sequence table 189 (step 205). If YES in the step 203, only the job step name of the Jth entry of the executed job step name list 195 is registered in the job step execution sequence table 189 (step 207).

Note that in the file allocation processing in the step 75 of FIG. 8, the non-specified storage device allocated to a file may be changed in a unit of a job step or in a unit of a job as the first embodiment.

With this, it is possible to reduce the processing required in the rerun thereby to reduce the rerun time by changing the processing unit in the rerun into a job step from a job.

According to the present invention, there is an effect of reducing rerun time by automating rerun processing and skipping rerun and file access of unnecessary jobs by storing access configurations from respective jobs to all the files, determining those jobs that require rerun automatically based on abovementioned access configurations, and further skipping unnecessary file access among rerun jobs.

Further, there is an effect of inhibiting unnecessary rerun in a unit of job step by storing inheritance data between job steps and providing steps utilized at the rerun time.

Further, there is an effect of preventing diffusion of the rerun job scope by storage device trouble and further reducing the rerun time by providing the step for controlling so that the files are stored in different storage devices in a unit of job or in a unit of job step.

Furthermore, when a trouble occurs, in allocating a file, in the storage device in which the file is located, it is possible to localize the trouble influence scope even in case the number of the storage devices is less as compared with the number of files by selecting the same storage device as the file to which access is made by a job or a job step requiring rerun together with the job or the jog step making access thereto.

Furthermore, when storage devices corresponding to the number of files exist, it is possible to localize the influence scope by storage device trouble and to reduce the rerun time by reducing the rerun processing objects by allocating respective files to different storage devices to the utmost.

Moreover, when configurations of making access to files from respective jobs are determined in advance or can be specified from the execution contents in the past, it is possible to realize localization of the rerun scope in a series of jobs as a whole by specifying the file group influenced by the trouble in advance and allocating them to the same . storage device collectively.

What is claimed is:

1. A computer implemented method of controlling execution of a series of jobs, said method being executed by a computer system comprising access information storage means, executing means, and rerun control means, the method comprising steps of:
   sequentially executing said series of jobs under control of the executing means;
   generating, by the system, file access information representing access to files by each job;
   storing the file access information in the access information storage means;
   when one of the series of jobs is abnormally terminated, determining, by the rerun control means, destructed files based on the file access information and said one abnormally terminated job;
   specifying, by the rerun control means, jobs to be rerun from among said series of jobs as rerun jobs based on the file access information of said series of jobs; and
   rerunning, by the rerun control means, said rerun jobs.

2. The method according to claim 1, wherein
   said file access information represents at least one of no access, read access, write access, and read and write access to each file by each job, and one of a read error, a write error and no error, said sequentially executing step includes setting a flag indicating one of the read error and the write error in accordance with the access result to each file by each job, the no error being indicated by the read and write flags not set, and
   said determining step comprises determining, as said destructed files first files associated with the read error or the write error, second files accesses by said terminated abnormally job and files allocated to storage devices to which the first and the second files have been allocated.

3. The method according to claim 2, wherein
   said specifying step comprises the step of specifying as said rerun jobs, jobs which have performed the write access or the read and write access to the destructed files.

4. The method according to claim 1, wherein
   said file access information represents one of no access, read access, write access, and read and write access to each file by each job, and
   said specifying step comprises determining, as said rerun jobs, jobs which have made one of the write access and the read and write access to files accessed by said abnormally terminated job.

5. The method according to claim 1, wherein said specifying step comprises the steps of:
   specifying said abnormally terminated job and the following jobs as said rerun jobs when said file access information indicates no access to any of said files by said abnormally terminated job; and
   specifying all of said series of jobs as said rerun jobs when said file access information indicates other than no access to any of said files by said abnormally terminated job.

6. The method according to claim 1, further comprising the step of designating one job as a rerun start job among said series of jobs, and wherein said specifying step comprises the steps of:
   specifying said abnormally terminated job and following jobs as said rerun jobs when said file access information indicates no access to any of said filed by said abnormally terminated job; and
   specifying said designated job and the following jobs as said rerun jobs when said file access information indicates other than no access to any of said files by said abnormally terminated job.

7. The method according to claim 1, further comprising the step of judging whether or not each of said files is to be accessed by each of said rerun jobs, in accordance with said file access information, and wherein said rerunning step comprises the step of selectively skipping access to each of said files by each of said rerun jobs in accordance with the judged results.

8. The method according to claim 1, further comprising the step of allocating said files to a plurality of storage devices in units of jobs.

9. The method according to claim 8, wherein said specifying step comprises the steps of:
   regarding, when said file access information indicates that said abnormally terminated job has accessed to any of said files, files allocated to storage devices to which said accessed files have been allocated, as the destructed files; and specifying said rerun jobs t recover said regarded files.

10. The method according to claim 9, wherein said specifying step further comprises specifying, as said rerun jobs, jobs which have write-accessed to said regarded files.

11. A computer implemented method of managing execution of a series of jobs, each of which comprises a plurality of job steps, said method being executed by a computer system comprising access information storage means, executing means, execution information storage means, and rerun control means, the method comprising steps of:

sequentially executing, by the executing means, said series of jobs in units of job steps while storing inherited information in the execution information storage means between job steps;

generating, by the system, file access information representing access to files by each job step;

storing the file access information in the access information storage means;

determining, by the rerun control means, destructed files based on the file access information and said abnormally terminated job step when one of the job steps is abnormally terminated.

specifying, by the rerun control means, job steps to be rerun among said series of jobs as rerun job steps based on the file access information and the job steps; and rerunning, by the rerun control means, said rerun job steps in accordance with said inherited information.

12. The method according to claim 11, wherein said file access information indicates one of no access, read access, write access, and read and write access to each file by each job step.

13. The method according to claim 11, wherein said file access information indicates at least one of no access, read access, write access, and read and write access to each file by each job step and one of a read error, a write error and no error.

14. The method according to claim 11, wherein said specifying step comprises the steps of:

specifying said abnormally terminated job step and the following job steps as said rerun job steps when said file access information indicates no access to any of said files by said abnormally terminated job step; and specifying all of the job steps as said rerun job steps when said file access information indicates other than no access to any of said files by said abnormally terminated job step.

15. The method according to claim 11, further comprising the step of designating as rerun a start job step one among said job steps, and wherein said specifying step comprises the steps of:

determining said abnormally terminated job step and the following job steps as said rerun job steps when said file access information indicates no access to any of said files by said abnormally terminated job step; and determining said designated job step and the following job steps as said rerun job steps when said file access information indicates other than no access to any of said files by said abnormally terminated job step.

16. The method according to claim 11, further comprising the step of judging whether or not each of said files is to be accessed by each of said rerun job steps, and wherein said rerunning step comprises the step of selectively skipping access to each of said files by each of said rerun job steps in accordance with the judge result.

17. The method according to claim 11, further comprising the step of allocating said destructed files to a plurality of storage devices in units of job steps.

18. The method according to claim 1, wherein said specifying step comprises the steps of:

regarding, when said file access information indicates that said abnormally terminated job step has accessed to any of said files, files allocated to storage devices to which said accessed file are allocated as the destructed files; and specifying said rerun job steps to recover said destructed files.

19. A system for controlling execution of a series of jobs accompanied by access to files in storage devices, comprising:

execution information storage means for storing execution information indicating sequence and conditions of said series of jobs;

access information storage means for storing file access information indicating access to each of said files by each of said series of jobs;

executing means for executing said series of jobs in accordance with said execution information stored in said execution information storage means; and rerun control means for, when one of said series of jobs is terminated abnormally, determining jobs to be rerun among said series of jobs in accordance with said file access information, storing execution information of said to-be-rerun jobs in said execution information storage means, and starting said executing means.

20. The system according to claim 19, further comprising:

allocation information storage means for producing and storing file allocation information indicating said storage devices to which said destructed files are to be allocated; and allocation means for selecting allocatable storage devices from among said storage devices, and allocating said files to said allocatable storage devices in accordance with at least one of said file access information and said file allocation information.

* * * * *

UNITED STATES PATENT AND TRADEMARK OFFICE
CERTIFICATE OF CORRECTION

PATENT NO. : 5,321,835
DATED : June 14, 1994
INVENTOR(S) : Kazuaki Tanaka, et al.

It is certified that error appears in the above-indentified patent and that said Letters Patent is hereby corrected as shown below:

Claim 9, column 17, line 3, delete "t" and substitute therefor --to--.

Signed and Sealed this

Thirteenth Day of September, 1994

Attest:

BRUCE LEHMAN

Attesting Officer          Commissioner of Patents and Trademarks